United States Patent
Sahita et al.

(10) Patent No.: US 12,189,726 B2
(45) Date of Patent: Jan. 7, 2025

(54) ON-DEMAND PAGING SUPPORT FOR CONFIDENTIAL COMPUTING

(71) Applicant: Intel Corporation, Santa Clara, CA (US)

(72) Inventors: Ravi Sahita, Portland, OR (US); Anjali Singhai Jain, Portland, OR (US); Reouven Elbaz, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 287 days.

(21) Appl. No.: 17/854,670

(22) Filed: Jun. 30, 2022

(65) Prior Publication Data
US 2022/0335109 A1  Oct. 20, 2022

(51) Int. Cl.
G06F 13/28 (2006.01)
G06F 9/455 (2018.01)
G06F 21/12 (2013.01)

(52) U.S. Cl.
CPC ........ *G06F 21/121* (2013.01); *G06F 9/45558* (2013.01); *G06F 13/28* (2013.01); *G06F 2009/4557* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS 8,244,954 B2  8/2012  Ganesh et al.
10,198,202 B2* 2/2019  Tsirkin ............... G06F 3/068
10,499,248 B2* 12/2019 Li ..................... G06F 21/62
11,392,405 B2* 7/2022  Liu .................... G06F 21/57
2015/0186680 A1* 7/2015  Johnson ............. G06F 21/57
                                                     713/193
2019/0042477 A1* 2/2019  Chhabra ............. G06F 21/78
2021/0192056 A1* 6/2021  Chang ............... G06F 12/1483
2022/0350499 A1* 11/2022 He .................... G06F 3/0644

OTHER PUBLICATIONS

Intel, "Intel® Trust Domain CPU Architectural Extensions", Ref. #343754-002US, May 2021, 40 pages.
Intel, White Paper, "Intel® Trust Domain Extensions", Ref. #343961-001US, Jul. 2020, 9 pages.
Intel, White Paper, The Intel® Converged Security and Management Engine IOMMU Hardware Issue—CVE-2019-0090 and CVE-2020-0566, Version 1.1, Jun. 2020, 15 pages.

* cited by examiner

*Primary Examiner* — Elias Mamo
(74) *Attorney, Agent, or Firm* — JAFFERY WATSON HAMILTON & DESANCTIS LLP

(57) ABSTRACT

On-demand paging support for confidential computing is described. An example of an apparatus includes circuitry including one or more processors including a first processor, the first processor including a TEE and registers, wherein the one or more processors are to: receive a memory access request associated with a trust domain (TD), wherein one or more direct memory access payloads associated with the request being generated by a protocol engine (PE) of a peripheral device and written to a host interface (HIF), the HIF including an address translation engine (ATE); and, in response to a page fault being identified for a payload, divert the payload and forward a payload fault to one or more TD fault buffers in a set of registers, and resolve the page fault by an ATE driver and a virtual machine manager using the TEE.

20 Claims, 8 Drawing Sheets

ON-DEMAND PAGING SUPPORT FOR CONFIDENTIAL COMPUTING

FIELD

This disclosure relates generally to the field of electronic devices and, more particularly, to on-demand paging support for confidential computing.

BACKGROUND

In data operations, virtualization enables multiple virtual environments in a physical hardware system. In virtualization, a virtual machine (VM) is software that, when executed on appropriate hardware, simulates a physical computer system. There may be multiple virtual machines running on a single host machine. Each virtual machine may run its own guest operating system (OS) and applications, as well as interact with peripheral devices such as Peripheral Component Interconnect express (PCIe) devices. Peripheral devices may interact with virtual machines, including accessing memory of the virtual machines using direct memory access (DMA) through an address translation service (ATS).

In a system providing virtualization, a peripheral device, such as network interface cards (NICs and other hardware) or other network interface circuitry, may be responsible for connecting host devices, such as computers and servers, to a network (such as the Internet, an internal network, or other system), thus allowing access to virtual machines hosted by a host system. The networking circuitry may operate to transfer data to and from the networking device over the network, including access to virtual machines. The network interface circuitry provides various functions, including, for example, I/O interrupt, direct memory access interfaces, partitioning, and data transmission. A network interface circuit may include an address translation engine (ATE) that provides network address translation services.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
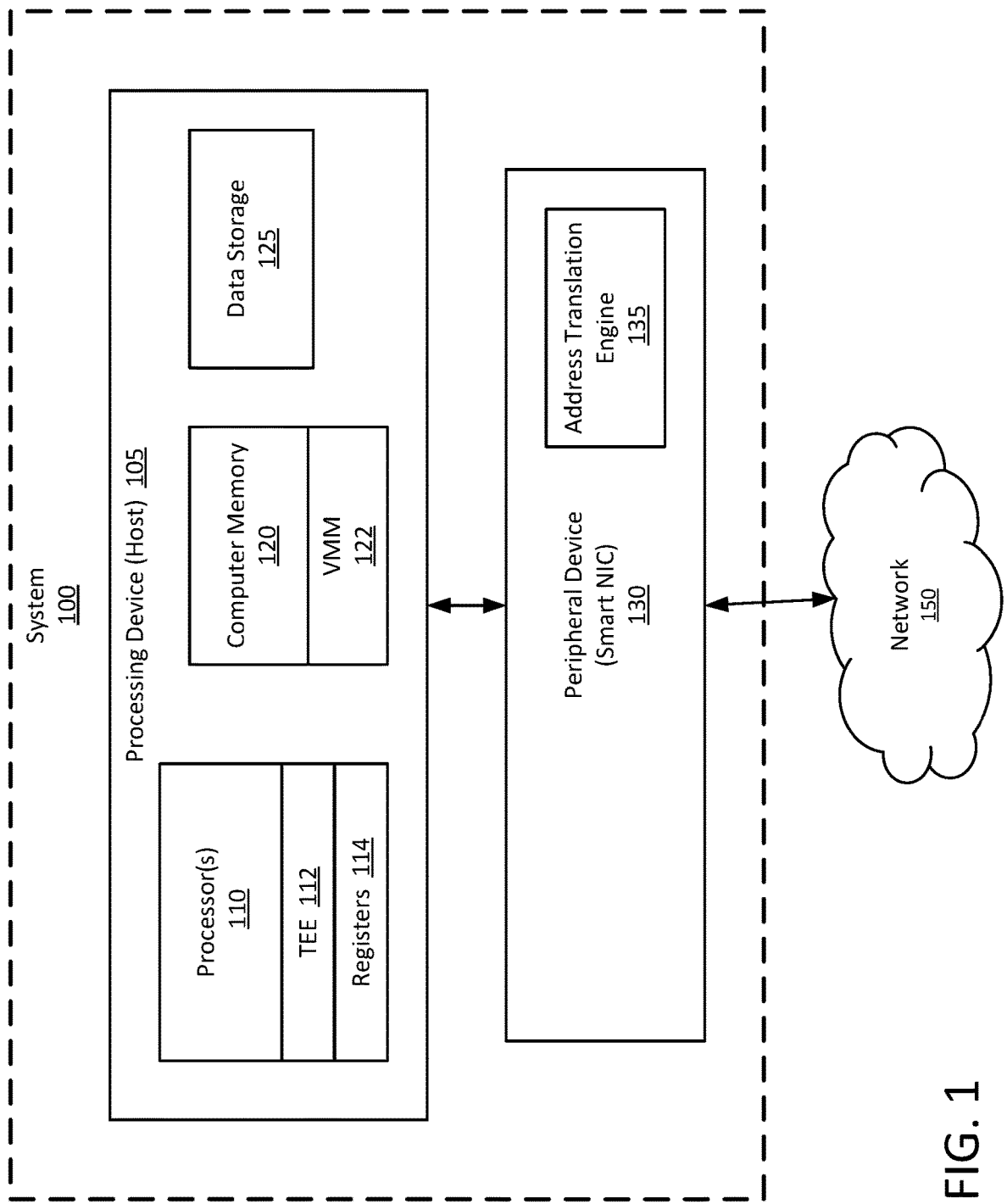
FIG. 1 illustrates an example of a system including a network interface.

Embodiments described herein are directed to on-demand paging support for confidential computing.

In a system providing virtualization operation, a peripheral device, such as Smart NICs (Network Interface Cards) or other network interface circuitry, may include an address translation engine (ATE) to provide support for network address translation. In network address translation, network addresses for an external network may be mapped into another network, thereby enabling operations including access to a virtual machine. As used herein, network interface card (NIC) refers to a computer hardware component operable to enable devices to communicate over a computer network. A network interface card includes an electronic circuit board designed to connect a computer or other internet-capable devices to a computer network. Other examples of peripheral devices may include any suitable Peripheral Component Interconnect express (PCIe) devices, storage devices, cryptographic engines, compression engines, and others. Virtual machine (VM) refers to a virtualization or emulation of a computer system.

In some examples, an address translation engine of a peripheral device may support the ability to buffer data that is destined for a specific virtual machine such that a host driver can asynchronously handle page faults, correct the mapping fault for the virtual machine, and then move the page data from the fault buffer queue into the virtual machine's memory. This process is referred to as on-demand paging (ODP) for virtual memory management. In a system that utilizes on-demand paging, an operating system will copy a page into physical memory only upon identification of a page fault, wherein an attempt is made to access the page and a determination is made that the page is not already in memory. In general, a process may begin execution with no pages in the physical memory, with page faults occurring until each of the relevant pages are loaded into physical memory.

A protocol engine (PE) through an address translation engine (ATE) may write an entry into an I/O page fault (IPF) queue that indicates a descriptor for a DMA operation that has encountered a page fault. The fault buffer queue provides a set of descriptors and data buffers for temporarily storing data from faulting DMA writes until a page fault has been resolved. A pointer to these buffers is provided to direct the faulting payloads for temporarily storing payloads while the page fault is being resolved. The I/O page fault queue is a queue with entries that contain a descriptor for a DMA operation that has encountered a page fault. The descriptor contains information for an address translation engine on-demand paging (ATE ODP) driver to successfully resolve the page fault.

However, confidential computing provides a challenge for on-demand paging. In confidential computing, one or more trust domain (TD) virtual machines (which may also be referred to simply as trust domains or TDs) may be implemented, trust domain (TD) refers to a hardware-isolated, virtual machine. In confidential computing, hardware and/or software elements required for on-demand may be outside of a trusted computing base (TCB) for a trust domain. The trusted computing base (TCB) refers to the components of a system that are required to establish and maintain the security of the system, and may include certain hardware, firmware, software, operating systems, and other elements.

In particular, for confidential computing a virtual machine manager (VMM) and host software stack (i.e., the software stack for a host device) may be located outside of the trusted computing base. For this reason, the virtual machine manager and host software stack are generally unable to access trust domain virtual machines, thus preventing the proper operation of on-demand paging. As used herein, virtual machine manager (VMM, or hypervisor) refers to software that creates and runs virtual machines, which may include one or more trust domains. The virtual machine manager allows a host computer to support multiple guest virtual machines by virtually sharing its resources, such as memory and processing.

In some embodiments, a system, apparatus, or process provides support for on-demand paging in confidential computing. In some embodiments, a system may include hardware elements and/or software within the TCB for a trust domain to support secure on-demand paging. In some embodiments, a system incorporates an additional set of hardware registers to support trusted operation in on-demand paging. In such example, the registers are SAI (Security Attributes of Initiator) enforced to the CPU SEAM (Secure Arbitration Mode) operation to enable a TDX module (or other TEE component) to maintain a trusted set of fault buffer queues (FBQs) and I/O page fault (IPF) queues. TDX refers to Intel® Trust Domain Extensions software, which provides architectural elements to deploy hardware-isolated virtual machines, referred to as trust domains (TDs). This enables the TDX module to perform data movement to the TDs in a trusted manner while allowing a virtual machine manager to manage this capability.

FIG. 1 illustrates an example of a system including a network interface. As shown in FIG. 1, a system 100 may include a processing device, which may be referred to as a host 105, where the host may include a computer, server, or other form of processing device. Among other elements, the host 105 includes circuitry including one or more processors 110, where the processors may include a central processing unit (CPU), graphics processing unit (GPU), or other type of processor. At least one processor of the one or more processors includes a trusted execution environment (TEE) 112. The TEE 112 is a secure area of the processor, the TEE being an isolated execution environment that provides certain security features, such as isolated execution, integrity of applications executing within the TEE, and confidentiality. The TEE 112 may include, but is not limited to, a TDX module. The processor 110 further includes multiple registers, which may, for example, be utilized to hold data for one or more queues in processing of data.

Figure 7:
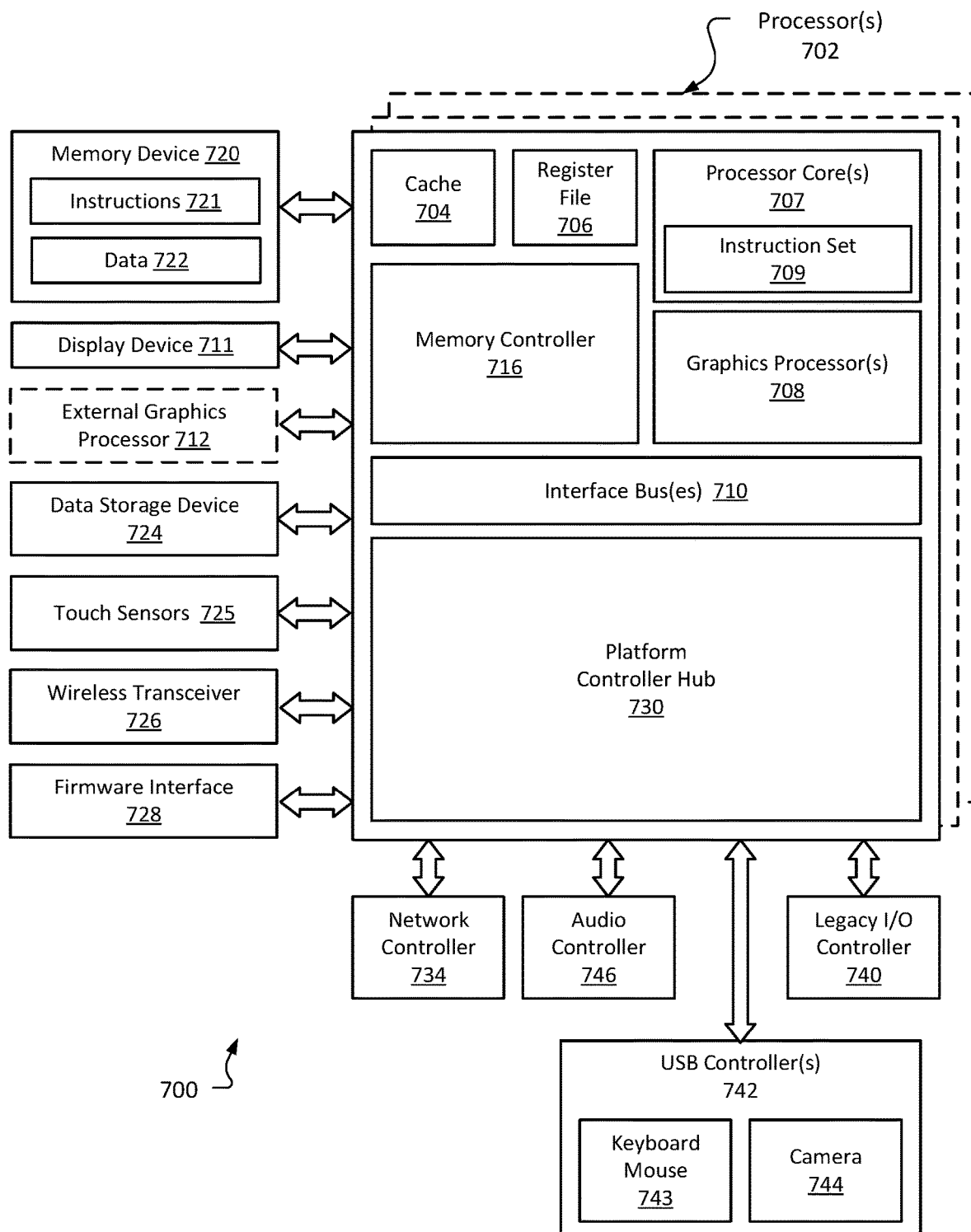
FIG. 7 illustrates an embodiment of an exemplary computing architecture for on-demand paging in confidential computing, according to some embodiments.

The host further includes computer memory 120, which may include random access memory (RAM), read-only memory (ROM), flash memory, or other types of memory; and data storage 125, such as hard disk drives (HDDs) or solid state drives (SSDs). The computer memory may include a virtual machine manager (VMM) 122 to provide management of one or more virtual machines hosted by the host 105. Other elements of the host 105 may be as illustrated in FIG. 7.

The system 100 further includes peripheral device 130, which may include a smart network interface card (NIC) or other network interface circuitry that may be coupled with the host 105 to provide network communication, such as communication with a network 150. The peripheral device 130 may include an address translation engine (ATE) 135. The address translation engine supports on-demand paging, the engine providing the ability to buffer data that is destined for a specific virtual machine such that a host driver can asynchronously handle page faults, correct the mapping fault for the virtual machine, and then move the data from a fault buffer queue into the virtual machine's memory.

However, in a processor 110 of the host 105 including the TEE 112, the on-demand paging is generally unsupported for confidential computing in an existing system because a trusted computing base of the processor 110 does not contain elements to support such page for a trust domain. In particular, the trusted computing base for a trust domain does not include the virtual machine manager (VMM, or hypervisor) and host software, and thus these elements are not allowed access to the trust domain.

In some embodiments, the system is structured to include additional hardware and/or software elements within the trusted computing base for a trust domain, and thus enabling on-demand paging support for a trust domain. In some embodiments, the registers 114 include additional hardware registers to support trusted operation in on-demand paging, wherein the registers enable the implementation of on-demand paging in confidential computing.

Figure 2:
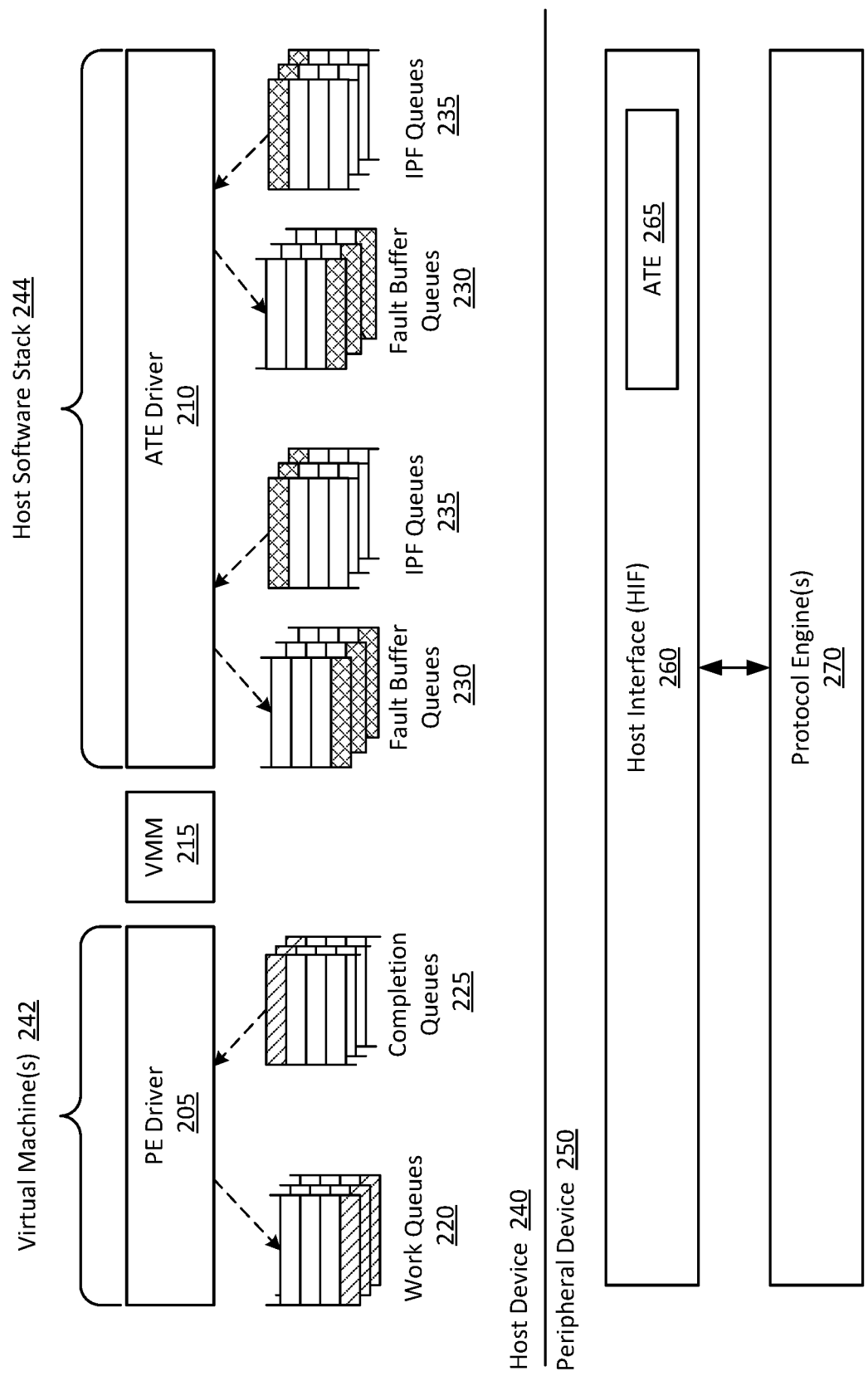
FIG. 2 illustrates an example of an apparatus or system to provide support for on-demand paging.

FIG. 2 illustrates an example of an apparatus or system to provide support for on-demand paging. As illustrated in FIG. 2, a host device 240 (in general a first circuitry in a system) is coupled with peripheral device 250 (a second circuitry in the system), wherein the peripheral device 250 may include a smart NIC or other network interface circuitry. The peripheral device 250 includes a host interface (HIF) 260 to interface between the network interface circuitry and the host device 240, and a protocol engine 270 for the network interface. The host interface 260 includes an address translation engine (ATE) 265 that supports on-demand paging, and includes an ability to buffer data that is destined for a specific virtual machine such that a host driver can asynchronously handle page faults, correct the mapping fault for the virtual machine, and then move the data from the fault buffer queue into the virtual machine's memory.

The host device 240 includes a protocol engine driver 205 (PE driver) residing in a particular virtual machine 242 (where the virtual machine may be one of multiple virtual machines supported by the host device), the PE driver 205 to receive payload entries from one or more completion queues 225, with the entries being handled and provided to one or more work queues 220 for processing. The entries may include memory accesses for one or more direct memory access operations. The host device further includes a virtual machine manager 215 (such as VMM 122 illustrated in FIG. 1) that manages the one or more virtual machines 242.

The peripheral device 250 may interact with each virtual machine 242 as if it were a physical machine using the protocol engine 270. The protocol engine 270 may operate as a direct memory access (DMA) engine for a virtual function (VF) or physical function (PF) of the peripheral device 250. There may be multiple protocol engines 270 to enable interaction with multiple virtual machines 242. The protocol engines 270 may interface with the guest device drivers through the host interface 260. The protocol engines 270 may directly access hardware components of the host device 240, such as to read from or write to the physical memory corresponding to the guest memory of the virtual machine 242, using a virtualization management protocol on the host device 240, such as a virtualization technology-direct (VT-d) driver that allows authorized technology direct I/O access.

The host device 240 further includes an ATE driver 210 for the ATE 265, where the ATE driver 210 resides in a host software stack 244. The ATE driver 210 is to receive diverted payloads from one or more IPF queues 235 upon occurrence of page faults, with the entries being handled and directed to fault buffer queues 230 for resolution of the page faults. Upon resolving the page faults, the diverted payloads may be copied for delivery to application buffers, as further illustrated in FIG. 3A.

In confidential computing operations, the on-demand paging operations for the ATE driver 210 may not be supported. In confidential computing, the one or more virtual machines 242 may include a trust domain. The virtual machine manager 215 and the host software stack 244 may be located outside of a trusted computing base of the trust domain, and thus cannot access the trust domain, preventing proper operation of the on-demand paging.

Figure 3A:
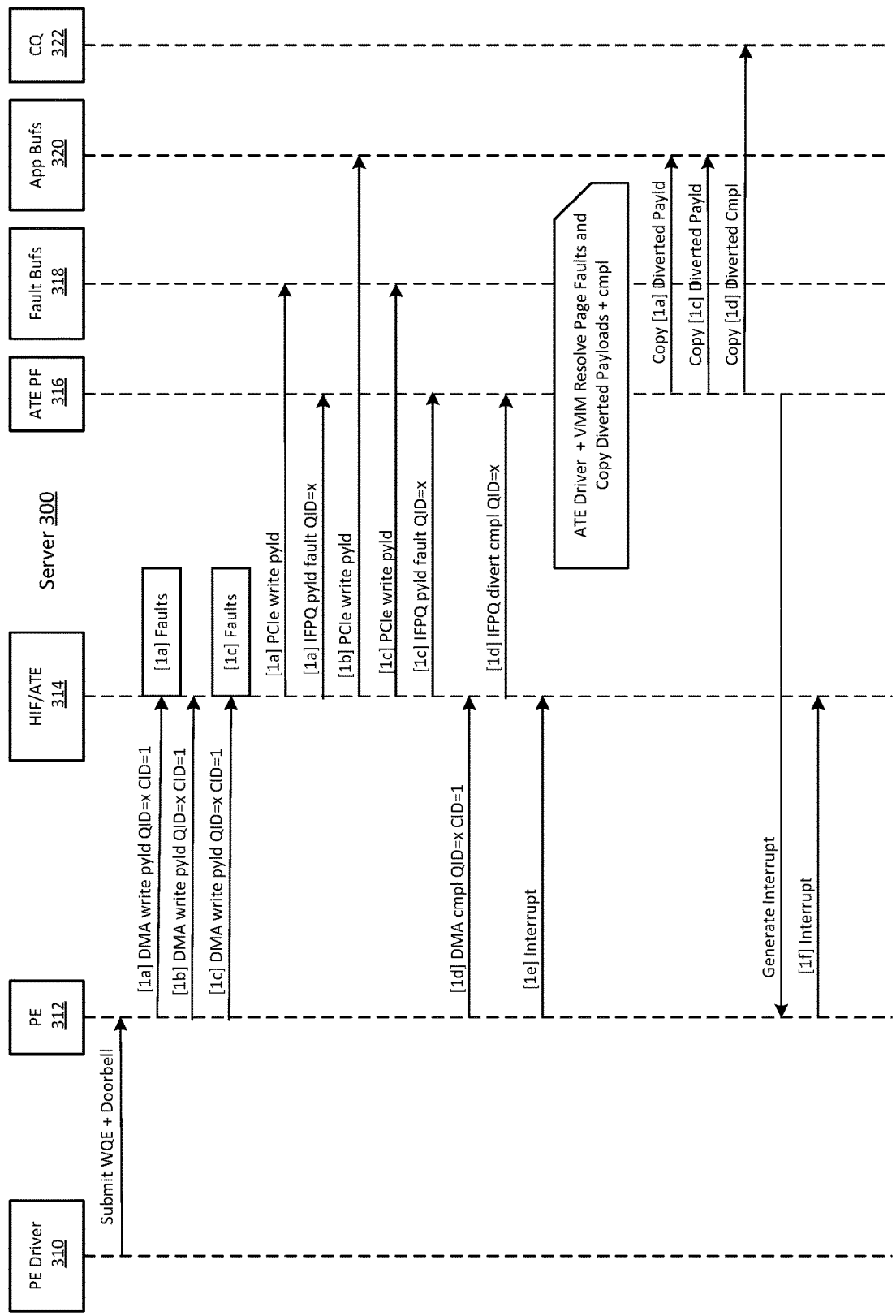
FIGS. 3A and 3B are timing diagrams to illustrate example processes for address translation engine operation in handling page faults.
Figure 3B:
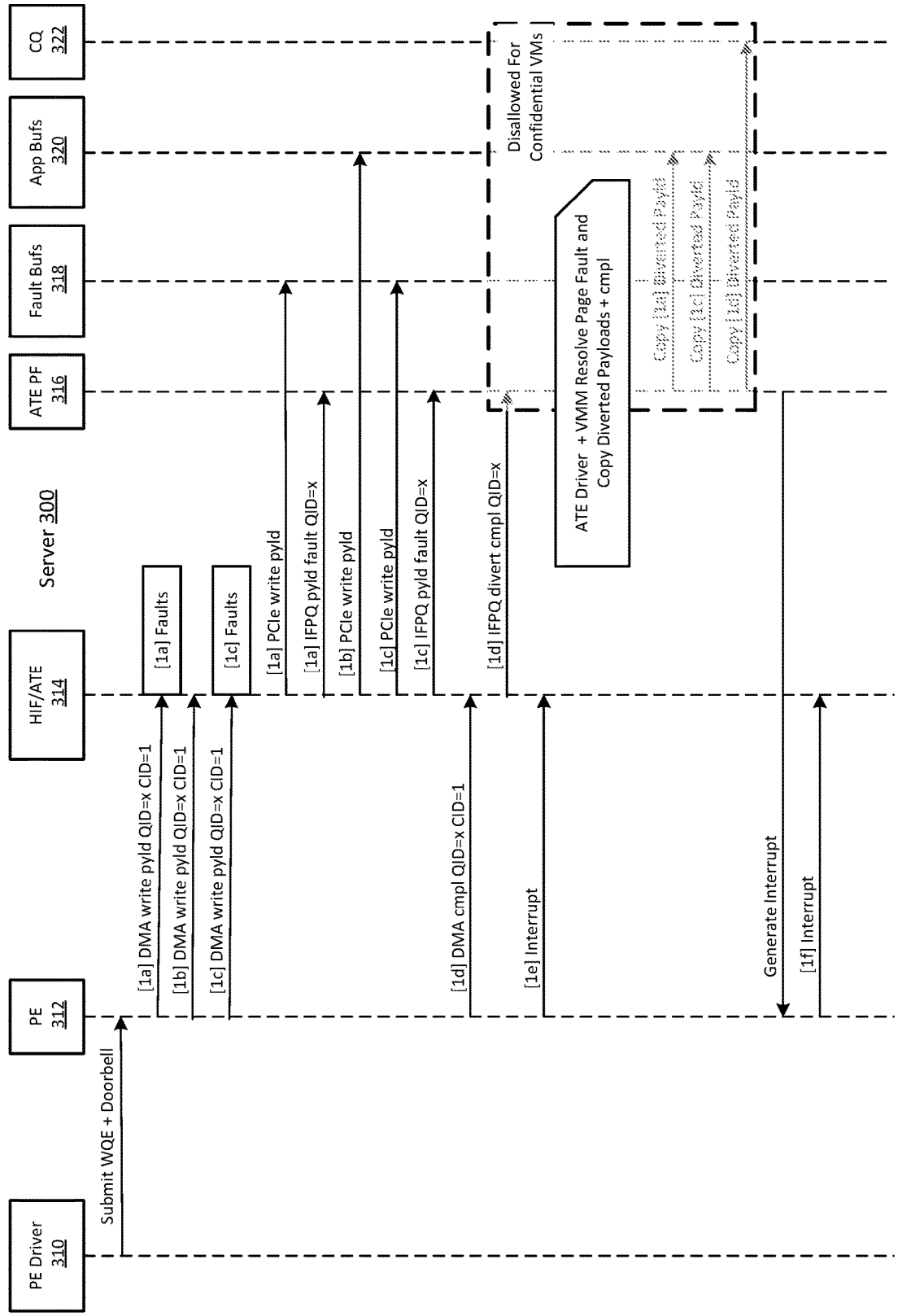

FIGS. 3A and 3B are timing diagrams to illustrate example processes for address translation engine operation in handling page faults. As illustrated in FIG. 3A, communications in a server 300 are provided between protocol engine (PE) driver 310, protocol engine 312, a host interface (HIF) 314 including an address translation engine (ATE) 314, an ATE PF (Physical Function) 316, fault buffers (Fault Bufs) 318, application buffers (App Bufs) 320, and completion queues (CQ) 322. In an example operation, the PE driver 310 transfers a work queue entry (WQE) and doorbell signal to the protocol engine 312, the doorbell signal referring to a signal to alert the PE element regarding the new entry. In this example, the protocol engine 312 provides resulting direct memory access (DMA) payloads through address translation service (ATS), shown as [1a], [1b], and [1c] DMA write pyld QID=x, CID=1. QID refers to a Query ID, and CID refers to a Content ID.

In this example, DMA writes [1a] and [1c] result in page faults as the pages are not yet contained in memory, while DMA write [1b] regards a page in memory. DMA write [1b] continues with a PCIe (Peripheral Component Interconnect Express) write from the host interface 314 to application buffers 320 (PCIe write pyld). In response to the page faults, [1a] and [1c] continue with the PCIe write from the host interface 314 to the fault buffers 318 and an IPFQ (I/O Page Fault Queue) payload fault written to the ATE PF 316. The writes are followed by a message (denoted as [1d]) from the PE 312 to the host interface 314 indicating completion of the direct memory address operation (CMA cmpl QID=x, CID=1), and an IPFQ divert completion message (IPFQ divert cmpl QID=x) from the host interface 314 to the ATE PF 316. An interrupt is then provided from the PE 312 to the host interface 314.

The ATE driver and the VMM may then resolve the page faults and copy the diverted payloads and completion for the direct memory access, shown as Copy [1a], [1c] Diverted Payld, from the ATE PF 316 to the application buffers 320, and Copy [1d] Diverted Cmpl from the ATE PF 316 to the completion queues 322 to indicate that the memory transfer is complete. This may be followed by a request to generate an interrupt from the ATE PF 316 to the PE 312, with the PE 312 then directing an interrupt [1f] to the host interface 314. The operation of the ATE thus enables handling the page faults, correcting the mapping fault for the virtual memory, and then moving the data from the fault buffer queue into the virtual machine memory.

However, in a confidential computing operation involving a trust domain, the handling of page faults as illustrated in FIG. 3A will not be authorized. As shown in FIG. 3B, the operation for the resolution of page faults and the copying of the diverted payloads and completion are disallowed for confidential virtual machines. In confidential computing, the virtual machine monitor and host software stack are located outside of the trusted computing base for a trust domain and cannot access trust domain, thus preventing the proper operation of the on-demand paging.

Figure 4:
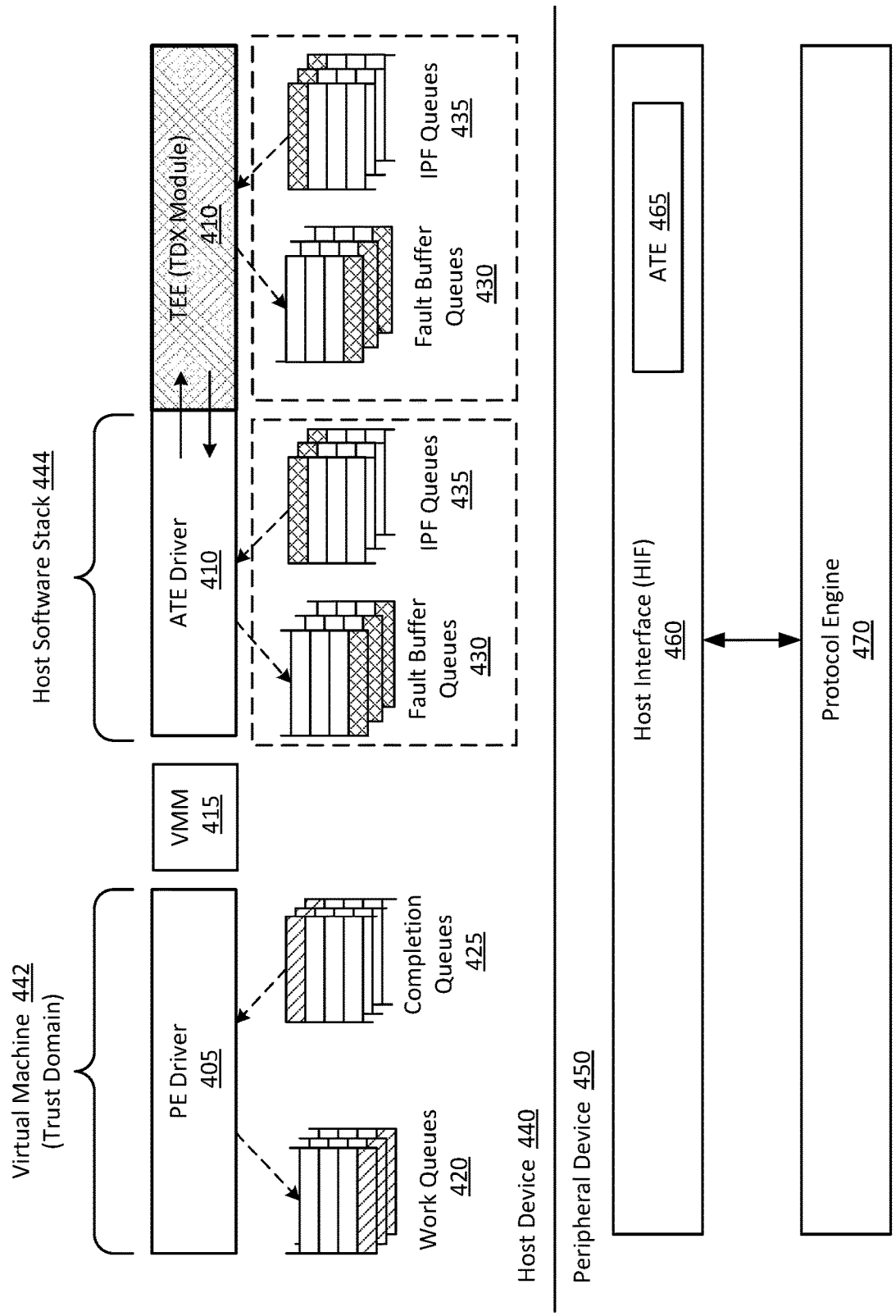
FIG. 4 illustrates an example of an apparatus or system to provide support for on-demand paging in confidential computing, according to some embodiments.

FIG. 4 illustrates an example of an apparatus or system to provide support for on-demand paging in confidential computing, according to some embodiments. As illustrated in FIG. 4, a host device 440 is coupled with peripheral device 450, wherein the peripheral device 450 may include a smart NIC or other device. The peripheral device 450 includes an HIF 460 to interface between the peripheral device 450 and the host device 440, and a protocol engine 470 for the network interface. The host interface 460 includes an address translation engine (ATE) 465 that supports an ability to buffer data that is destined for a specific virtual machine such that a host driver can asynchronously handle page faults, correct the mapping fault for the virtual machine, and then move the data from the fault buffer queue into the virtual machine's memory.

The host device 440 includes the protocol engine driver 405 (PE driver) residing in a particular virtual machine 442 (where the virtual machine may be one of multiple virtual machines supported by the host device). In an example, the virtual machine 442 may be a trust domain virtual machine for confidential computing. The PE driver 405 is to receive payload entries from one or more completion queues 425, with the entries being handled and provided to one or more work queues 420 for processing. The entries may include memory accesses for one or more direct memory access operations. The host device further includes a virtual machine manager 415 (such as VMM 122 illustrated in FIG. 1) that manages the one or more virtual machines 442.

The host device 440 further includes the ATE driver 410 for the ATE 465, where the ATE driver 410 resides in a host software stack 444. The ATE driver 410 is to receive diverted payloads from one or more IPF queues 435, with the entries being handled and directed to fault buffer queues 430 for resolution of page faults. Upon resolving the page faults, the diverted payloads may be copied for delivery to application buffers.

In some embodiments, the host device 440 includes an additional set of registers to enable on-demand paging in the confidential computing operation including the trust domain virtual machine 442. As illustrated, the host device may further include a trusted execution environment (TEE) 410, which may include a TDX module. The additional registers enable the operation of confidential queues for processing with regard to a trust domain virtual machine. As shown, the TEE 410 receives diverted payloads from one or more IPF queues 435, with the entries being handled and directed to fault buffer queues 430 for resolution of page faults. Upon resolving the page faults, the diverted payloads may be copied for delivery to application buffers for the trust domain.

Figure 5:
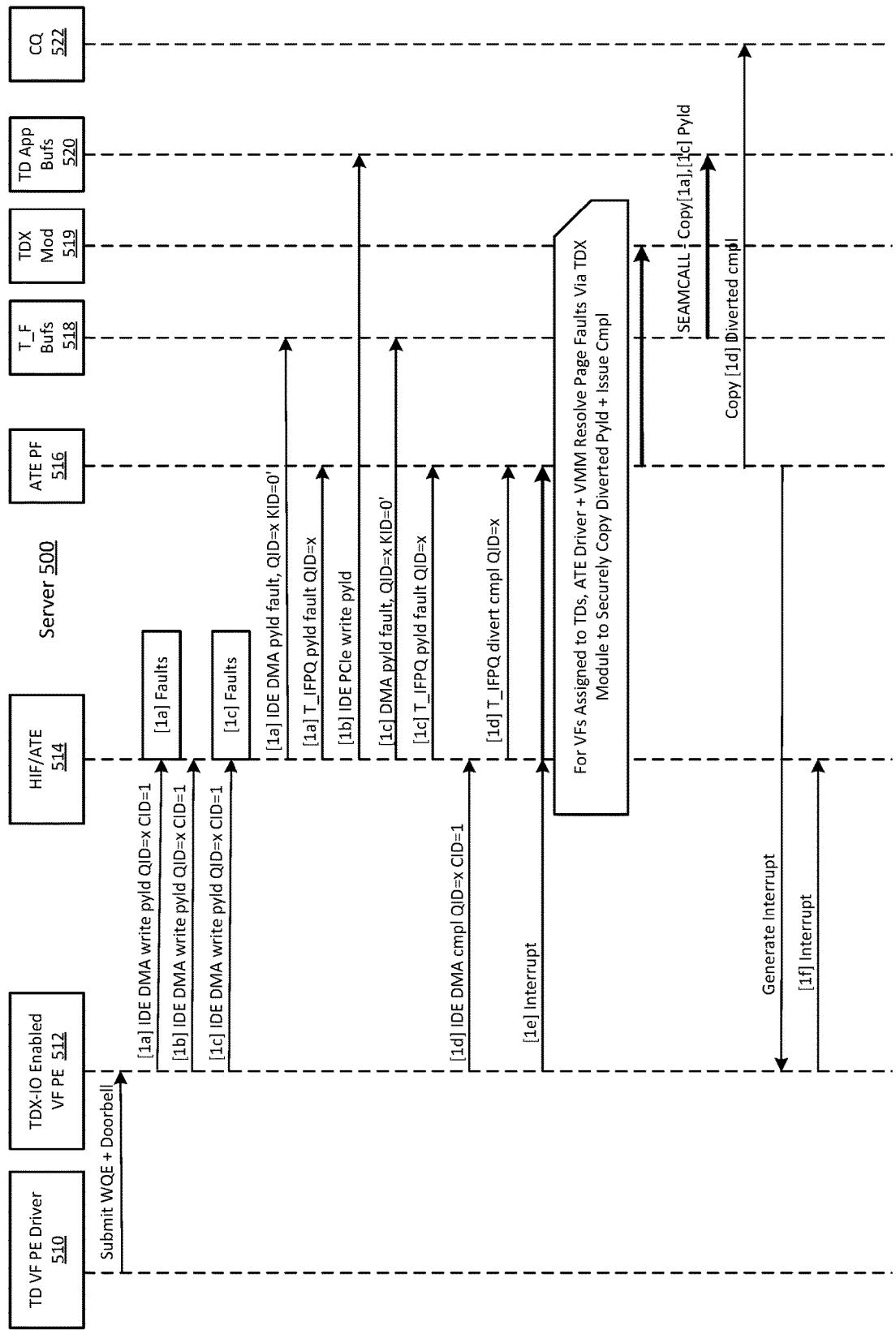
FIG. 5 is a timing diagram to illustrate an example process for address translation engine operation in handling page faults in confidential computing, according to some embodiments.

The operations for on-demand paging in confidential computing may proceed as illustrated in FIG. 5.

FIG. 5 is a timing diagram to illustrate an example process for address translation engine operation in handling page faults in confidential computing, according to some embodiments. As illustrated in FIG. 5, communications in a server 500 are provided between a trust domain virtual function protocol engine (TD VF PE) driver 510, a TEE-enabled (such as a TDX-IO enabled) virtual function protocol engine (TDX-IO enabled VF PE) 512 (generally referred as PE 512 herein), a host interface (HIF) 514 including an address translation engine (ATE) 514, a ATE physical function (ATE PF) 516, trust domain fault buffers (T_F Bufs) 518, a TDX module (or other TEE module) 519, trust domain application buffers (TD App Bufs) 520, and completion queues (CQ) 522. (The server 500 may also support on-demand paging for non-TD virtual machines, as illustrated in FIG. 3A.)

In this implementation, the PE 512 and HIF 514 are TEE (such as TDX-IO) enabled hardware, and are contained within the trusted computing base (TCB) for a trust domain.

The TD VF PE driver 510 and TD application buffers 520 are trust domain software, which are contained with the TCB of the trust domain. Further, the TDX module 519 or its assets are within the TCB of all trust domains for the server 500.

In an example operation, the TD VF PE driver 510 transfers a work queue entry (WQE) and doorbell signal to the PE 512. In this example, the PE 512 provides resulting IDE direct memory access (DMA) writes of payloads, shown as [1a], [1b], and [1c] IDE (Integrated Drive Electronics) DMA write pyld QID=x, CID=1. QID refers to a Query ID, and CID refers to a Content ID.

In this example, DMA writes [1a] and [1c] result in page faults as the pages are not contained in memory, while DMA write [1b] regards a page in memory. DMA write [1b] continues with an IDE PCIe write from the host interface 514 to trust domain application buffers 520 (IDE PCIe write pyld). In response to the resulting page faults, [1a] and [1c] continue with an IDE DMA payload fault from the host interface 514 to the TD fault buffers 518 and a TD IPFQ payload fault written to the ATE PF 516. The writes are followed by a message (denoted as [1d]) from the TDX-IO VF PE 512 to the host interface 514 indicating completion of the direct memory address operation (IDE DMA cmpl QID=x, CID=1), and an TD IPFQ divert completion message (T IPFQ divert cmpl QID=x) from the host interface 514 to the ATE PF 516. An interrupt is then provided from the PE 512 to the host interface 514.

For VFs assigned to trust domains, the ATE driver and the VMM resolve page faults via the TDX module 519 to securely copy the diverted payload and issue a completion. As shown, there is SEAMCALL to copy the [1a] and [1c] payloads to the TD application buffers 520, and a copy of the [1d] diverted completion from the ATE PF 516 to the completion queues 522. SEAMCALL refers to a call to a VMX (Virtual Machines Extension) root operation. The SEAMCALL operates to drain the TD IPF queue, verifying RID/PASID (Process Address Space ID) for diverted payload in the TD IPF queue matching the target of the copy requested by the VMM/ATE PD driver. This is read via the keyID 0' and copies to the target TD keyID, and removes the diverted completion. This may be followed by a request to generate an interrupt from the ATE PF driver 516 to the PE 512, with the PE 512 then generating an interrupt [1f] to the host interface 514.

In this matter, the operation of the ATE allows for handling the page faults in confidential computing for a trust domain VM, correcting the mapping fault for the virtual memory and moving the data from the fault buffer queue into the virtual machine memory.

Figure 6:
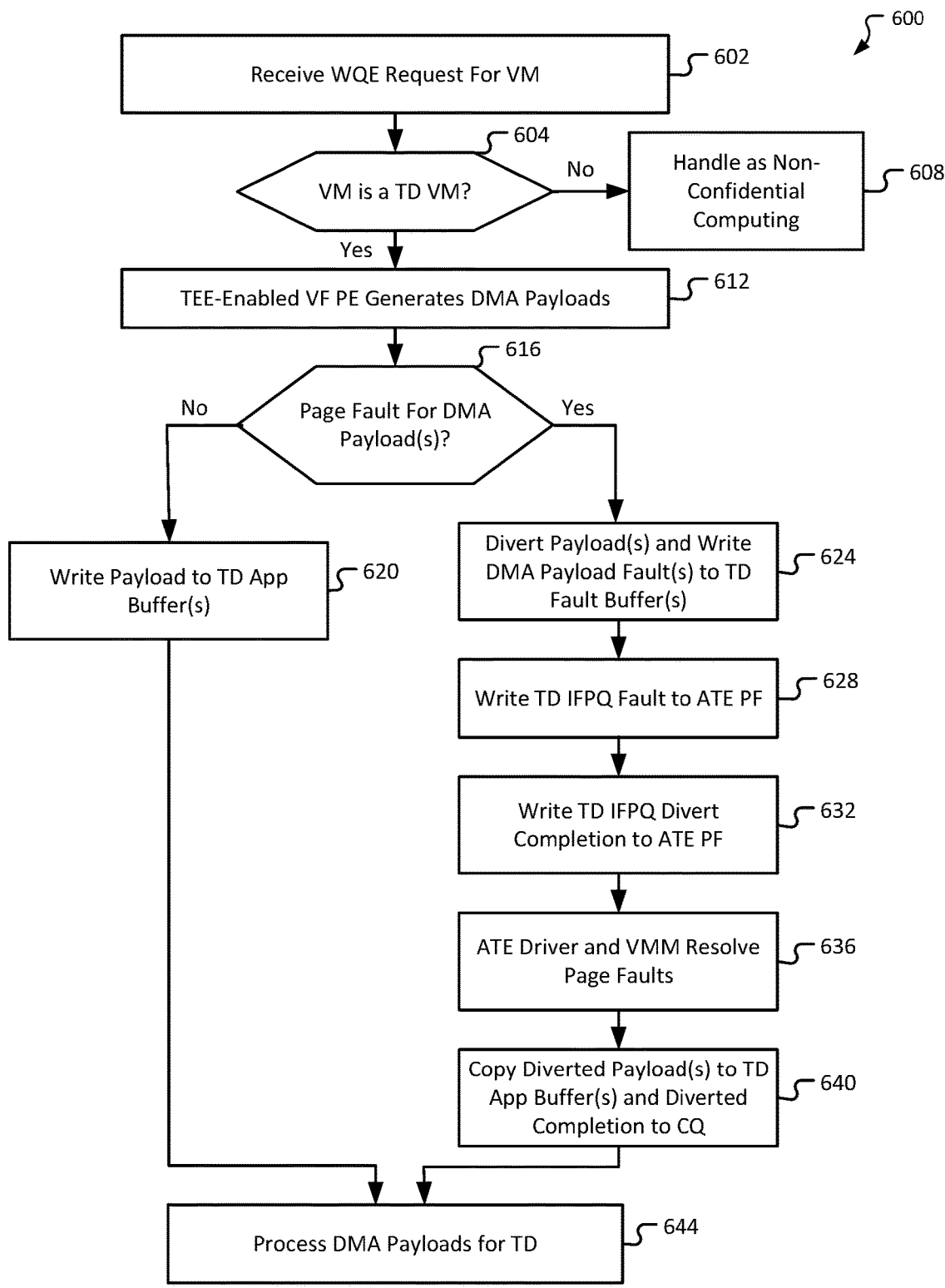
FIG. 6 is a flowchart to illustrate a process for on-demand paging in confidential computing, according to some embodiments.

FIG. 6 is a flowchart to illustrate a process for on-demand paging in confidential computing, according to some embodiments. In some embodiments, a process 600 includes receiving a work queue entry (WQE) for a particular virtual machine (VM) in a system 602 (which may include a host device and a peripheral device, or in general a first circuitry and a second circuitry), as in an attempt to access memory of a processing device. In some embodiments, an operation is dependent on whether the VM is a trust domain VM (TD VM) 604. If not, the request may be handled in a process application for non-confidential computing 608, such as illustrated in FIG. 3A.

In some embodiments, if the VM is a TD 604, the WQE is directed to a TEE enabled virtual function protocol engine (VF PE), which generates DMA payloads for the request 612. In an operation, a memory lookup may fail, and the protocol engine (PE) of a peripheral device may issue an Address Translation Service (ATS) translation request through the address translation engine (ATE). In response, a host input/output memory management unit may look for the translation in translation buffer and, if the translation is missing, perform a page walk. If the page walk shows that the page is not in the I/O memory, the host input/output memory management unit may respond with an ATS completion message indicating a page fault. A determination thus is made whether a page fault occurs for one or more of the DMA payloads 616. For any one or more DMA payloads for which there is not a page fault (i.e., the relevant page is present in memory), the one or more payloads are written to one or more TD application buffers for processing 620.

For any one or more DMA payloads for which there is a page fault (i.e., the relevant page is not present in memory), a DMA payload fault is written to one or more TD fault buffers 624, and a TD IRPQ fault is written to an ATE physical function (ATE PF) 628. Following such writes, a TD IRPQ divert completion is written to the ATE PF 632.

In some embodiments, the ATE driver and the VMM resolve the page faults 636, and proceed to copy diverted payloads and converted completion to a completion queue 640 to indicate that the memory transfer is complete. The DMA payloads for the TD in the TD application buffers may then be processed for the TD 644.

FIG. 7 illustrates an embodiment of an exemplary computing architecture for on-demand paging in confidential computing, according to some embodiments. In various embodiments as described above, a computing architecture 700 may comprise or be implemented as part of an electronic device. In some embodiments, the computing architecture 700 may be representative, for example, of a computer system that implements one or more components of the operating environments described above. The computing architecture 700 may be utilized to provide on-demand paging, such as described in FIGS. 1A-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In one embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory 704 is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, non-volatile memory device such as flash memory device or phase-change memory device, or some other memory device having suitable performance to serve as process memory. Memory device 720 may further include non-volatile memory elements for storage of firmware. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device, or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

The following Examples pertain to certain embodiments:

In Example 1, an apparatus includes circuitry including one or more processors including a first processor, the first processor including a trusted execution environment (TEE) and a plurality of registers, wherein the one or more processors are to: receive a memory access request associated with a trust domain (TD), one or more direct memory access (DMA) payloads associated with the request being generated by a protocol engine (PE) of a peripheral device and written to a host interface (HIF) of the peripheral device, the HIF including an address translation engine (ATE); and, in response to a page fault being identified for a DMA payload of the one or more DMA payloads: divert the DMA payload and forward a payload fault to one or more TD fault buffers in a set of registers of the plurality of registers, and resolve the page fault by an ATE driver and a virtual machine manager (VMM) using the TEE.

In Example 2, the one or more processors are further to process the one or more DMA payloads for the TD.

In Example 3, the one or more processors are further to securely copy the diverted payload associated with the page fault to a TD application buffer.

In Example 4, the PE and the HIF are within a trusted computing base (TCB) for the TD.

In Example 5, the TD PE driver and the application buffer are trust domain software contained with the TCB of the TD.

In Example 6, the set of registers are designated for trust domains (TDs).

In Example 7, the peripheral device includes a network interface card (NIC).

In Example 8, one or more non-transitory computer-readable storage mediums having stored thereon executable computer program instructions that, when executed by one or more processors, cause the one or more processors to perform operations comprising: receiving a memory access request associated with a trust domain (TD) in a system, the system including a trusted execution environment (TEE), wherein one or more direct memory access (DMA) payloads associated with the request are generated by a protocol engine (PE) of a peripheral device and the one or more DMA payloads are written to a host interface (HIF) of the peripheral device, the HIF including an address translation engine (ATE); and, in response to a page fault being identified for a DMA payload of the one or more DMA payloads: diverting the DMA payload and forwarding a payload fault to one or more TD fault buffers in a set of registers, and resolving the page fault by an ATE driver and a virtual machine manager (VMM) using the TEE.

In Example 9, the instructions further include instructions for: processing the one or more DMA payloads for the TD.

In Example 10, the instructions further include instructions for: securely copying the diverted payload associated with the page fault to a TD application buffer.

In Example 11, the PE and the HIF are within a trusted computing base (TCB) for the TD.

In Example 12, a TD PE driver and the application buffer are trust domain software contained with the TCB of the TD.

In Example 13, the set of registers are designated for trust domains (TDs).

In Example 14, the peripheral device includes a network interface card (NIC).

In Example 15, a method includes receiving a memory access request associated with a trust domain (TD) in a system, the system including a trusted execution environment (TEE), wherein one or more direct memory access (DMA) payloads associated with the request are generated by a protocol engine (PE) of a peripheral device and the one or more DMA payloads are written to a host interface (HIF) of the peripheral device, the HIF including an address translation engine (ATE); and, in response to a page fault being identified for a DMA payload of the one or more DMA payloads, diverting the DMA payload and forwarding a payload fault to one or more TD fault buffers in a set of registers, and resolving the page fault by an ATE driver and a virtual machine manager (VMM) using the TEE.

In Example 16, the method further includes processing the one or more DMA payloads for the TD.

In Example 17, the method further includes securely copying the diverted payload associated with the page fault to a TD application buffer.

In Example 18, the PE and the HIF are within a trusted computing base (TCB) for the TD.

In Example 19, a TD PE driver and the application buffer are trust domain software contained with the TCB of the TD.

In Example 20, the set of registers are designated for trust domains (TDs).

In Example 21, an apparatus includes means for receiving a memory access request associated with a trust domain (TD) in a system, the system including a trusted execution environment (TEE), wherein one or more direct memory access (DMA) payloads associated with the request are generated by a protocol engine (PE) of a peripheral device and the one or more DMA payloads are written to a host interface (HIF) of the peripheral device, the HIF including an address translation engine (ATE); and means for, in response to a page fault being identified for a DMA payload of the one or more DMA payloads: diverting the DMA payload and forwarding a payload fault to one or more TD fault buffers in a set of registers, and resolving the page fault by an ATE driver and a virtual machine manager (VMM) using the TEE.

In Example 22, the apparatus further includes means for processing the one or more DMA payloads for the TD.

In Example 23, the apparatus further includes means for securely copying the diverted payload associated with the page fault to a TD application buffer.

In Example 24, the PE and the HIF are within a trusted computing base (TCB) for the TD.

In Example 25, a TD PE driver and the application buffer are trust domain software contained with the TCB of the TD.

In Example 26, the set of registers are designated for trust domains (TDs).

In Example 27, the peripheral device includes a network interface card (NIC).

In Example 28, system includes a first circuitry including one or more processors including a first processor, the first processor including a trusted execution environment (TEE) and a plurality of registers; and a second circuitry including at least a host interface (HIF) and a protocol engine (PE), the host interface including an address translation engine (ATE), wherein, upon one or more page faults occurring for a trust domain (TD) in response to a direct memory access (DMA) payload from a TD PE driver, the HIF is to divert the DMA payload to an ATE physical function (PF) and forward one or more payload faults to one or more TD fault buffers in a set of registers of the plurality of registers, an ATE driver and a virtual machine manager (VMM) are to resolve the page faults using the TEE, and the ATE PF is to copy the diverted payload to a TD application buffer.

In Example 29, the one or more processors are to process the DMA payloads for the TD.

In Example 30, resolving the page faults includes securely copying diverted payloads associated with the page faults.

In Example 31, the PE and the HIF are within a trusted computing base (TCB) for the TD.

In Example 32, the TD PE driver and the application buffer are trust domain software contained with the TCB of the TD.

In Example 33, the set of registers are designated for trust domains (TDs).

In Example 34, the second circuitry includes a network interface circuitry.

In Example 35, a machine-readable storage includes machine-readable instructions that, when executed, cause a processor to implement a method as claimed in any preceding claim.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
   circuitry including one or more processors including a first processor, the first processor including a trusted execution environment (TEE) and a plurality of registers, wherein the one or more processors are to:
   receive a memory access request associated with a trust domain (TD), one or more direct memory access (DMA) payloads associated with the request being generated by a protocol engine (PE) of a peripheral device and written to a host interface (HIF) of the peripheral device, the HIF including an address translation engine (ATE); and
   in response to a page fault being identified for a DMA payload of the one or more DMA payloads:
   divert the DMA payload and forward a payload fault to one or more TD fault buffers in a set of registers of the plurality of registers, and
   resolve the page fault by an ATE driver and a virtual machine manager (VMM) using the TEE.

2. The apparatus of claim 1, wherein the one or more processors are further to process the one or more DMA payloads for the TD.

3. The apparatus of claim 1, wherein the one or more processors are further to securely copy the diverted DMA payload associated with the page fault to a TD application buffer.

4. The apparatus of claim 3, wherein the PE and the HIF are within a trusted computing base (TCB) for the TD.

5. The apparatus of claim 4, wherein the TD PE driver and the application buffer are trust domain software contained with the TCB of the TD.

6. The apparatus of claim 1, wherein the set of registers are designated for trust domains (TDs).

7. The apparatus of claim 1, wherein the peripheral device includes a network interface card (NIC).

8. One or more non-transitory computer-readable storage mediums having stored thereon executable computer program instructions that, when executed by one or more processors, cause the one or more processors to perform operations comprising:
   receiving a memory access request associated with a trust domain (TD) in a system, the system including a trusted execution environment (TEE), wherein one or more direct memory access (DMA) payloads associated with the request are generated by a protocol engine (PE) of a peripheral device and the one or more DMA payloads are written to a host interface (HIF) of the peripheral device, the HIF including an address translation engine (ATE); and
   in response to a page fault being identified for a DMA payload of the one or more DMA payloads:
   diverting the DMA payload and forwarding a payload fault to one or more TD fault buffers in a set of registers, and
   resolving the page fault by an ATE driver and a virtual machine manager (VMM) using the TEE.

9. The storage mediums of claim 8, wherein the instructions further include instructions for:
   processing the one or more DMA payloads for the TD.

10. The storage mediums of claim 8, wherein the instructions further include instructions for:
    securely copying the diverted DMA payload associated with the page fault to a TD application buffer.

11. The storage mediums of claim 10, wherein the PE and the HIF are within a trusted computing base (TCB) for the TD.

12. The storage mediums of claim 11, wherein a TD PE driver and the application buffer are trust domain software contained with the TCB of the TD.

13. The storage mediums of claim 8, wherein the set of registers are designated for trust domains (TDs).

14. The storage mediums of claim 8, wherein the peripheral device includes a network interface card (NIC).

15. A method comprising:
    receiving a memory access request associated with a trust domain (TD) in a system, the system including a trusted execution environment (TEE), wherein one or more direct memory access (DMA) payloads associated with the request are generated by a protocol engine (PE) of a peripheral device and the one or more DMA payloads are written to a host interface (HIF) of the peripheral device, the HIF including an address translation engine (ATE); and in response to a page fault being identified for a DMA payload of the one or more DMA payloads:
  diverting the DMA payload and forwarding a payload fault to one or more TD fault buffers in a set of registers, and
  resolving the page fault by an ATE driver and a virtual machine manager (WM) using the TEE.

16. The method of claim 15, further comprising: processing the one or more DMA payloads for the TD.

17. The method of claim 15, further comprising: securely copying the diverted DMA payload associated with the page fault to a TD application buffer.

18. The method of claim 17, wherein the PE and the HIF are within a trusted computing base (TCB) for the TD.

19. The method of claim 18, wherein a TD PE driver and the application buffer are trust domain software contained with the TCB of the TD.

20. The method of claim 15, wherein the set of registers are designated for trust domains (TDs).

* * * * *